Figure 1:
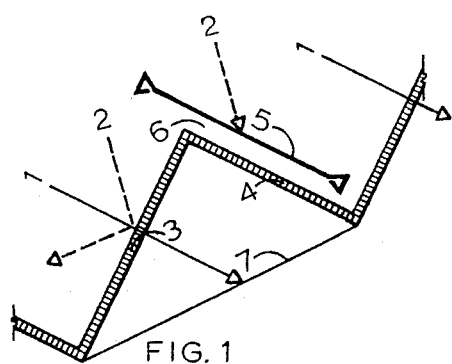

United States Patent [19]

Walsh

[11] Patent Number: 4,890,900
[45] Date of Patent: Jan. 2, 1990

[54] SOLAR CORRUGATION WITH SHIELD

[76] Inventor: James H. Walsh, P.O. Box 924, Longmont, Colo. 80502

[21] Appl. No.: 313,896

[22] Filed: Feb. 23, 1989

[51] Int. Cl.$^4$ .............................................. G02B 27/00
[52] U.S. Cl. ....................................... 350/263; 52/18
[58] Field of Search ................................ 350/258–264; 126/417; 52/18

[56] References Cited

U.S. PATENT DOCUMENTS

| | | | |
|---|---|---|---|
| 2,625,930 | 1/1953 | Harris | 126/417 |
| 2,958,259 | 11/1960 | Ewing | 350/259 |
| 3,257,486 | 6/1966 | Luboshez | 350/263 X |
| 4,143,492 | 3/1979 | Dunn | 52/18 |
| 4,357,074 | 11/1982 | Nardini | 350/259 |
| 4,498,455 | 2/1985 | Gramm | 350/264 X |

Primary Examiner—Richard A. Wintercorn

[57] ABSTRACT

A solar corrugation with shield, which is a stationary device with no moving parts, controls the transmission of solar radiant energy on a supply and demand relationship throughout the seasons of the year.

The corrugation has a ninety degree, or thereabouts, angle between its two planar sides, or panes, with one pane being exposed to and the other pane being protected from solar radiant energy.

The corrugation is composed of a material transparent to solar radiant energy.

The shield is a planar plate, or shield, so positioned to protect the protected pane of the corrugation. The shield, in its position, is separated from the protected pane of the corrugation by an air space.

The shield is composed of a material opaque to and absorbent of solar radiant energy.

1 Claim, 1 Drawing Sheet

U.S. Patent

Jan. 2, 1990

4,890,900

4,890,900

SOLAR CORRUGATION WITH SHIELD

FIELD OF INVENTION

The corrugation with shield is a stationary device, with no moving parts, for the control of the transmission of solar radiant energy on a supply and demand relationship during the seasons of the year.

The control of solar radiant energy has been of interest to the general public during most of this century with special attention shown by the public since the occurrence of the most recent global fossil fuel crisis. Additional interest has been focused on this form of energy due to the public's awareness of fossil fuel's detrimental effects on the environment.

Heretofore, the capture and control of solar radiant energy has been claimed, to various degrees, by previous patents, some of which are the following:

U.S. Pat. No. 2,625,930-Harris relates to building structures for the heating of interiors by solar radiant heating.

U.S. Pat. No. 2,958,259-Ewing is the construction of shades and panels in the control of solar radiant energy for skylights.

U.S. Pat. No. 4,143,492-Dunn is a roof and wall structure for a controlled sunlite glass or plant house.

U.S. Pat. No. 4,357,074-Nardini is a transparent plate device, with one flat side and one prismatic side, for the dousing and control of the transmission of sunlight without interfering with the transmission of diffused light.

U.S. Pat. No. 4,498,455-Gramm is a glazing material consisting of two series of planar members contiguously and alternately disposed along a common plane in an angled relation to each other, wherein the members define a transparent zone and an opaque zone, in the transmission and control of solar radiant energy.

OBJECTS OF THE INVENTION

One object of the solar corrugation with shield invention is the control of the transmission of solar radiant energy on a supply and demand relationship it receives during the seasons of the year.

Another object of the solar corrugation with shield in use is the conservation of nonrenewable energy resources.

Still, another object of the solar corrugation with shield is the replacement of energy resources whose use detrimentally affects the environment.

Yet, another object of the solar corrugation with shield is in joining other devices and systems to provide benefits in the use of solar radiant energy.

A further object of the solar corrugation with shield is the aesthetic ability to harmoniously blend in with the supporting structures and their surroundings.

Still, a further object of the solar corrugation with shield is durability, low maintenance and resistance to damage from severe vagaries of the environment.

Yet, a further object of the solar corrugation with shield is the use of noncritical resource materials and the employment of common processes and manufacturing methods in its production.

DRAWINGS OF THE INVENTION

The formal drawings consist of nine FIGS., 1 through 9 inclusive, as follows:

FIG. 1. A transverse section view of a solar corrugation with shield example as installed on a 6/12 inclined base reference plane, located at a northern or southern hemisphere latitude of forty degrees and exposed to the summer and winter solar radiant energy solstices.

Figure 2:
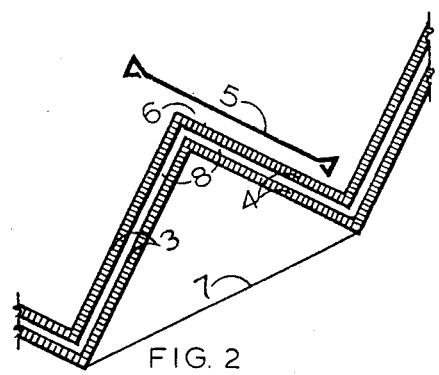

FIG. 2. A transverse section view of a multi layer solar corrugation with shield.

Figure 3:
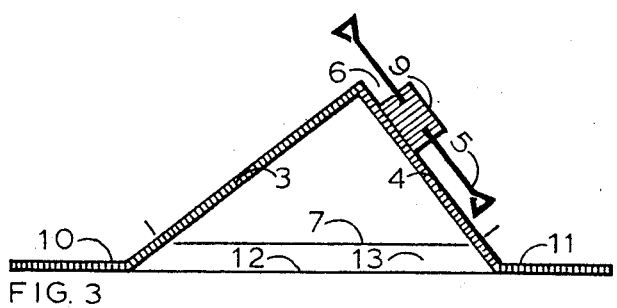

FIG. 3. A transverse section view of a solar corrugation with shield panel.

Figure 4:
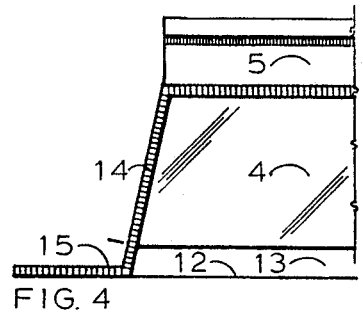

FIG. 4. A longitudinal section view of a solar corrugation with shield panel.

Figure 5:
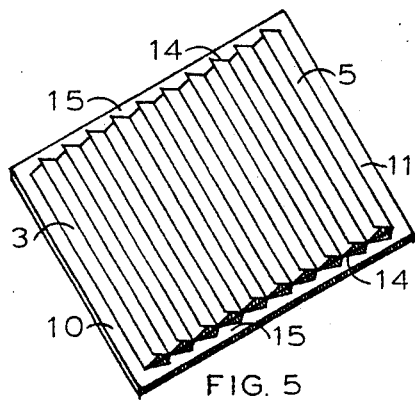

FIG. 5. An isometric view of transverse orientated solar corrugations with shields in a solar corrugation with shield panel.

Figure 6:
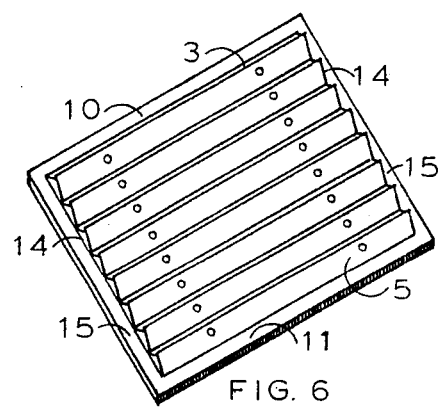

FIG. 6. An isometric view of longitudinal orientated solar corrugations with shields in a solar corrugation with shield panel.

Figure 7:
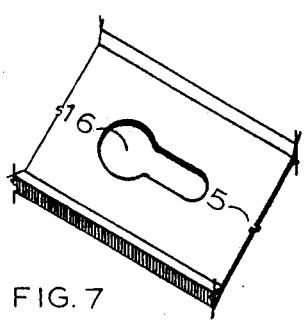

FIG. 7. An isometric view of a portion of a shield with a keyhole slot.

Figure 8:
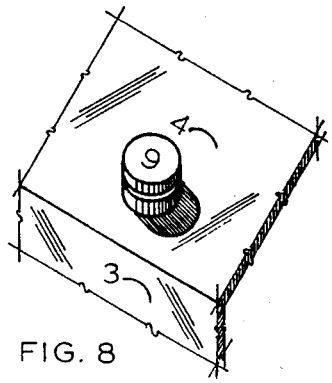

FIG. 8. An isometric view of a portion of a corrugation with a slotted stud.

Figure 9:
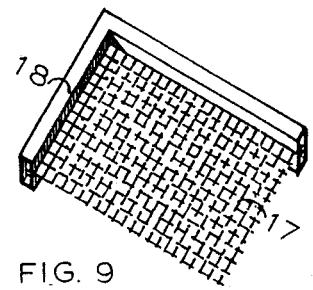

FIG. 9. An isometric view of a framed screen.

DRAWING REFERENCES OF THE INVENTION

The following is an index of the numerical references used in the formal drawings:
1. The Winter Solstice Solar Radiant Energy
2. The Summer Solstice Solar Radiant Energy
3. Exposed Pane
4. Protected Pane
5. Shield
6. Shield Air Space
7. Solar Corrugation with Shield Base Reference Plane
8. Intervening Void Insulating Space
9. Slotted Stud
10. Exposed Pane Foot
11. Protected Pane Foot
12. Solar Corrugation with Shield Panel Base Reference Plane
13. Air Passage Space
14. End Pane
15. End Pane Foot
16. Keyhole Slot
17. Screen
18. Screen Frame

DESCRIPTION OF THE INVENTION

The solar corrugation with shield, described herein, has essentially two basic parts, the solar corrugation and the shield.

The first part of the solar corrugation with shield is a formed planar sided corrugation with a ninety degree, or thereabouts, ridge angle between the two planar sides, or panes. The solar corrugation is composed of a material transparent to solar radiant energy such as glass, plastics or other suitable products.

The planar side, or pane, of the corrugation, which is exposed to solar radiant energy 1, is called the exposed pane 3. The remaining planar side, or pane, which is protected from the solar radiant energy 1 and 2, is called the protected pane 4.

The exposed pane 3, preferred in the planar transverse section form with smooth surfaces, can have other form and surface options.

The protected pane 3, preferred in the planar transverse section form with smooth surfaces, can also have other form and surface options.

The second part of the solar corrugation with shield is a planar plate called the shield 5. The shield 5 is composed of a material, opaque to and absorbant of solar radiant energy 2 such as copper with a black chrome oxide coat or other suitable products.

The shield 5, preferred in the planar transverse section form, with triangular edge sections, can have other form and surface options.

The shield 5 is positioned from, attached to and supported by the protected pane 4 by means of keyhole slots 16, in the shield 5, being mated to slotted studs 8 which are welded to the protected pane 4. Other types of suitable attachments in combination with supports, other than the protected pane 4, can be used.

The intervening space between the protected pane 4 and the shield 5 is called the shield air space 6.

The corrugation exposed pane 3 and protected pane 4 along with the shield 5 is called the solar corrugation with shield.

The solar corrugation with shield is referenced to its base reference plane 7.

The solar corrugation with shield exposed pane 3, protected pane 4, shield 5, corrugation ends 14, exposed pane foot 10, protected pane foot 11 and end feet 15, singularly and plurally, become a solar corrugation with shield panel.

The relation of the position of the solar corrugation with shield base reference plane 7 to the solar corrugation with shield panel base reference plane 12 forms the air passage space 13 and is applicable only to plurality arrangements.

The solar corrugation with shield, singularly or plurally, can be orientated in any angle between the transvers and the longitudinal positions, in respect to the base reference plane 12, of the solar corrugation with shield panel.

The solar corrugation with shield panel can be positioned in any inclined position from the horizontal to the vertical, inclusive, and orientated in any direction of the compass.

OPERATION OF THE INVENTION

In operation the solar corrugation with shield panel controls the transmission supply and demand relationship of the solar radiant energy it receives throughout the seasons of the year.

One operational example of the panel would be during the summer solstice period when the undesired solar radiant energy 2 strikes the shield 5 where it is absorbed and its heat dissipated into the surrounding atmosphere, including the shield air space 6, without entrance into the corrugation proper. Concurrently the solar radiant energy 2 also strikes the exposed pane 3 at a low angle of incidence thereby refracting, through the exposed pane 3, a minor amount of its heat component into the corrugation proper where it can be removed by convection through the air passage space 13.

Another operational example of the panel would be during the winter solstice period when the desired solar radiant energy 1 strikes the exposed pane 3 at a normal, or near normal, angle of incidence for the maximum transmission of energy through pane 3.

Still, another example would be the operation of the panel during the summer to winter solstices' period when a continual solar radiant energy 1 and 2 transmission gain occurs through the exposed pane 3 of the panel.

Yet, still another example would be the operation of the panel during the winter to summer solstices' period when a continual solar radiant energy 1 and 2 transmission loss occurs through the exposed pane 3 of the panel.

The use of the framed screen, considered an accessory and not a part of the invention, inserted in the air passage space 13 enhances the operation of the panel in providing additional control in the transmission of solar radiant energy. For example a fine wire open mesh screen will impede the transmission of the heat and light components of solar radiant energy less than a coarse wire close mesh screen 17.

The panel can operate efficiently in the temperate zones of the northern and southern hemispheres.

The panel in operation is adaptable to any compass orientation, such as south in the southern hemisphere and north in the northern hemisphere, where the heat of the summer sun is excluded and the diffused light rays replace the direct rays of the solar radiant energy in transmission through the exposed pane 3.

The panel is operable in any inclination position, from the horizontal to the vertical inclusive, such as horizontal roof skylights and vertical wall windows.

CONCLUSION OF THE INVENTION

In conclusion, the solar corrugation with shield panel is a simple and efficient device for the control of the transmission of solar radiant energy throughout all seasons of the year.

The panel, as ah entity or system component, can be effectively used in skylights, canopies, shades, solariums, windows, air and fluid solar heat collectors, greenhouses, auto rear windows and many other useful applications. One unusual application would be a cover over existing solariums to block unwanted summer heat outside the structure rather than inside the structure by the current use of complex interior shades or bulky insulation blankets.

Shield 5, in its outside position relationship to and its protection of the protected pane 4 from solar radiant energy, makes the panel unique.

The compatibility of the panel in joining with other devices and systems to produce beneficial results is one of its assets.

The panel uses common noncritical materials in its composition and employs simple processes and known methods of manufacture in its production.

The panel is a simple stationary device, with no moving parts, which is durable and requires little maintenance.

Society will benefit from the panel's role in replacing the use of nonrenewable energy resources whose use is detrimental to the environment.

I claim:

1. A Solar corrugation comprising a plurality of elongated, light-transmitting panes converging along their greater dimensions to form a series of V-shaped Louvres joined at approximately 90 degrees, alternating ones of said panes having substantially identically oriented slope provided with light absorbing, opaque material attached thereto in spaced relationship to form an air space therebetween, whereby solar radiant energy may be passed through the corrugation or absorbed in accordance with the season of the year.

* * * * *